US009404617B2

(12) United States Patent
Sartiaux et al.

(10) Patent No.: US 9,404,617 B2
(45) Date of Patent: Aug. 2, 2016

(54) CLAMP

(75) Inventors: Christophe Sartiaux, Surrey (GB); Ivar Breen, Stavanger (NO); Christophe Tarayre, Vestre Åmøy (NO)

(73) Assignee: Roxar Flow Measurement AS, Stavanger (NO)

( * ) Notice: Subject to any disclaimer, the term of this patent is extended or adjusted under 35 U.S.C. 154(b) by 86 days.

(21) Appl. No.: 13/813,283

(22) PCT Filed: Aug. 5, 2011

(86) PCT No.: PCT/EP2011/063506
§ 371 (c)(1),
(2), (4) Date: Feb. 26, 2013

(87) PCT Pub. No.: WO2012/017065
PCT Pub. Date: Feb. 9, 2012

(65) Prior Publication Data
US 2013/0175417 A1    Jul. 11, 2013

(30) Foreign Application Priority Data
Aug. 6, 2010 (NO) .................................. 20101117

(51) Int. Cl.
E21B 17/10     (2006.01)
F16M 13/02     (2006.01)
E21B 47/01     (2012.01)
F16L 3/08      (2006.01)
F16B 2/06      (2006.01)

(52) U.S. Cl.
CPC ............. *F16M 13/02* (2013.01); *E21B 17/1028* (2013.01); *E21B 17/1035* (2013.01); *E21B 47/01* (2013.01); *F16B 2/06* (2013.01); *F16L 3/08* (2013.01)

(58) Field of Classification Search
USPC ..................... 248/74.2, 56; 175/325.7, 325.5; 166/241.6, 65.1; 24/68 BT
See application file for complete search history.

(56) References Cited

U.S. PATENT DOCUMENTS

| 2,628,134 | A | | 2/1953 | Williams |
| 3,652,138 | A | | 3/1972 | Collett |
| 3,999,811 | A | | 12/1976 | Gray |
| 4,349,048 | A | * | 9/1982 | Clark .................... E21B 19/155 138/96 R |

(Continued)

FOREIGN PATENT DOCUMENTS

| GB | 763694 A | 12/1956 |
| WO | WO-2006/061513 A1 | 6/2006 |

OTHER PUBLICATIONS

Van Berlo, A., "International Search Report" for PCT/EP2011/063506, as mailed Jun. 14, 2012, 6 pages.

*Primary Examiner* — Bradley Duckworth
(74) *Attorney, Agent, or Firm* — Winstead PC

(57) ABSTRACT

Clamp (1, 1') comprising a main body (3, 3') adapted to encircle an inner element (101) or to be encircled by an outer element to which the clamp (1) can releasably connect. An axially extending opening extends through the main body (3, 3'). The clamp comprises a locking arm (5) which is connected to said main body (3, 3') at a base end (7), and which can bend elastically to move its oppositely positioned free end (9) in a substantially radial direction. The locking arm (5) comprises a locking pad (13) at a distance from the base end (7), which in a locking position of the locking arm (5) extends radially beyond an inner (4) or outer (4') diameter, respectively, of the main body (3, 3'). The locking pad (13) is adapted to engage with a recess (113) in said inner (101) or outer (101') element.

15 Claims, 8 Drawing Sheets

(56) References Cited

U.S. PATENT DOCUMENTS

| | | | |
|---|---|---|---|
| 4,600,063 A * | 7/1986 | Beasley | 175/325.5 |
| 5,095,981 A * | 3/1992 | Mikolajczyk | 166/241.6 |
| 5,833,019 A * | 11/1998 | Gynz-Rekowski | 175/325.6 |
| 6,679,325 B2 * | 1/2004 | Buytaert | 166/241.3 |
| 6,830,102 B2 * | 12/2004 | Kirk et al. | 166/241.6 |
| 6,871,706 B2 * | 3/2005 | Hennessey | 166/241.6 |
| 6,880,789 B2 * | 4/2005 | Benoit et al. | 248/74.2 |
| 6,997,254 B2 * | 2/2006 | Jenner | 166/241.6 |
| 7,140,431 B2 * | 11/2006 | Betts | 166/241.6 |
| 7,143,825 B2 * | 12/2006 | Pointing | 166/241.6 |
| 7,159,619 B2 * | 1/2007 | Latiolais, Jr. | B65D 59/00 138/96 T |
| 7,159,668 B2 * | 1/2007 | Herrera | 166/381 |
| 7,357,434 B2 * | 4/2008 | Latiolais, Jr. | E21B 19/12 138/96 T |
| 7,857,063 B2 * | 12/2010 | Thornton | 166/380 |
| 7,878,241 B2 * | 2/2011 | Buytaert et al. | 166/241.6 |
| 8,066,066 B2 * | 11/2011 | Linaker | 166/241.1 |
| 8,245,779 B2 * | 8/2012 | Lemke et al. | 166/241.6 |
| 8,555,964 B2 * | 10/2013 | MacLeod | 166/241.6 |
| 2003/0019624 A1 | 1/2003 | Davis | |
| 2006/0207768 A1 * | 9/2006 | Angman et al. | 166/380 |
| 2007/0131414 A1 * | 6/2007 | Calderoni et al. | 166/241.6 |
| 2009/0272525 A1 * | 11/2009 | Nutley et al. | 166/241.6 |
| 2009/0277648 A1 * | 11/2009 | Nutley et al. | 166/382 |
| 2010/0252274 A1 * | 10/2010 | Buytaert et al. | 166/380 |
| 2012/0061076 A1 * | 3/2012 | McDaniel et al. | 166/241.6 |
| 2012/0152518 A1 * | 6/2012 | Johanning et al. | 166/65.1 |
| 2012/0285679 A1 * | 11/2012 | Calderoni et al. | 166/241.6 |
| 2012/0312552 A1 * | 12/2012 | Rayssiguier | 166/380 |

\* cited by examiner

CLAMP

The present invention relates to a clamp for securing various equipment to ring shaped structures or bores, especially to pipes used in the field of hydrocarbon wells. The clamping according to the invention is particularly suitable for securing downhole gauges to a pipe string, such as a production tubing.

BACKGROUND

In the field of hydrocarbon wells, it is known to insert various types of measuring equipment into the well to measure downhole conditions. For instance pressure and temperature gauges are secured to the end of or a part of a production pipe string which is inserted into the well to bring the gauges to the point of measurement.

One method of securing the equipment to the pipe is to fasten ring-shaped clamps to the external diameter of the pipe, and connect the equipment in question to the clamps, for instance by welding. Connecting the clamps should be fast and reliable. To avoid costly retrieving operations or loosing equipment, one should be certain that neither the clamps nor the secured equipment is lost in the well.

In addition, an advantageous clamp exhibits small radial dimensions since it in a downhole application will be used in a limited space. Such a space is typically the annulus between the casing of a well and the production bore extending through it.

The present invention provides a clamp that complies with these requirements.

THE INVENTION

The present invention provides a clamp comprising a main body which is adapted to encircle an inner element, such as a pipe, or be encircled by an outer element, such as a bore, to which the clamp can releasably connect. An axially extending opening extends through the main body. According to the present invention, the clamp comprises a locking arm which is connected to the main body at a base end, and which can bend elastically to move its oppositely positioned free end in a substantially radial direction. The locking arm comprises a locking pad at a distance from the base end, which in a locking position of the locking arm extends radially beyond an inner or outer diameter, respectively, of the main body. The locking pad is adapted to engage with a recess in said inner or outer element.

The locking arm can extend substantially along the curvature of the main body, along a part of the circumference of the main body According to a preferred embodiment of the invention, the clamp has at least two locking arms, wherein at least one locking arm extends in a clockwise direction from its base end and at least one extends in an anti-clockwise direction. Such an embodiment of the clamp contributes in the ability to adsorb large torques in both directions.

Preferably, the clamp comprises a plurality of locking pads which are distributed at substantially equal mutual distances along said inner or outer diameter.

In yet another advantageous embodiment, the locking arm or arms comprise a manipulation interface, such as a threaded hole, for engagement when bending it in said substantially radial direction. Such a manipulation interface can for instance be adapted for engagement with a tool that can bend the locking arm between a locking position and an unlocked position. Particularly when the clamp comprises a plurality of locking arms, such as four or even more, such a tool can make a connection and disconnection process more feasible than performing the operations manually.

The clamp, with its main body, locking arm(s), and the locking pad(s) is preferably in one piece. That is, the components are for instance manufactured from the same piece or joined together to be non-detachable, such as by welding. The advantage is that no loose parts that can fall off from the clamp into a down hole completion. Thus, such a clamp is without bolts or other detachable components.

Yet another preferred technical feature of the clamp according to the invention is that the locking arm is arranged between two slits, one arranged on each longitudinal side of the locking arm. The slits are advantageously arranged between the locking arm and the main body.

The clamp can comprise an axially extending guiding groove arranged on the opposite radial side of the main body with respect to the locking pad With a clamp according to the present invention, one obtains a clamp with a small radial extension. This is particularly advantageous when used in the restricted spaces in hydrocarbon wells. Also, as mentioned above, without any loose or detachable parts, one does not risk that a part of the clamp is lost into the well. In addition one obtains a clamp which is easily attachable and detachable.

When used in a hydrocarbon well, as is regarded as the main purpose of the clamp according to the invention, the clamp shall both fix various equipment in correct position and protect the equipment from impact and applied loads during the whole lifetime.

EXAMPLE OF EMBODIMENT

Having described the clamp according to the invention in general terms, a more specific example of preferred embodiment will now be presented with reference to the drawings, in which FIG. 1 is a perspective view of a clamp according to the present invention;

Figure 1:
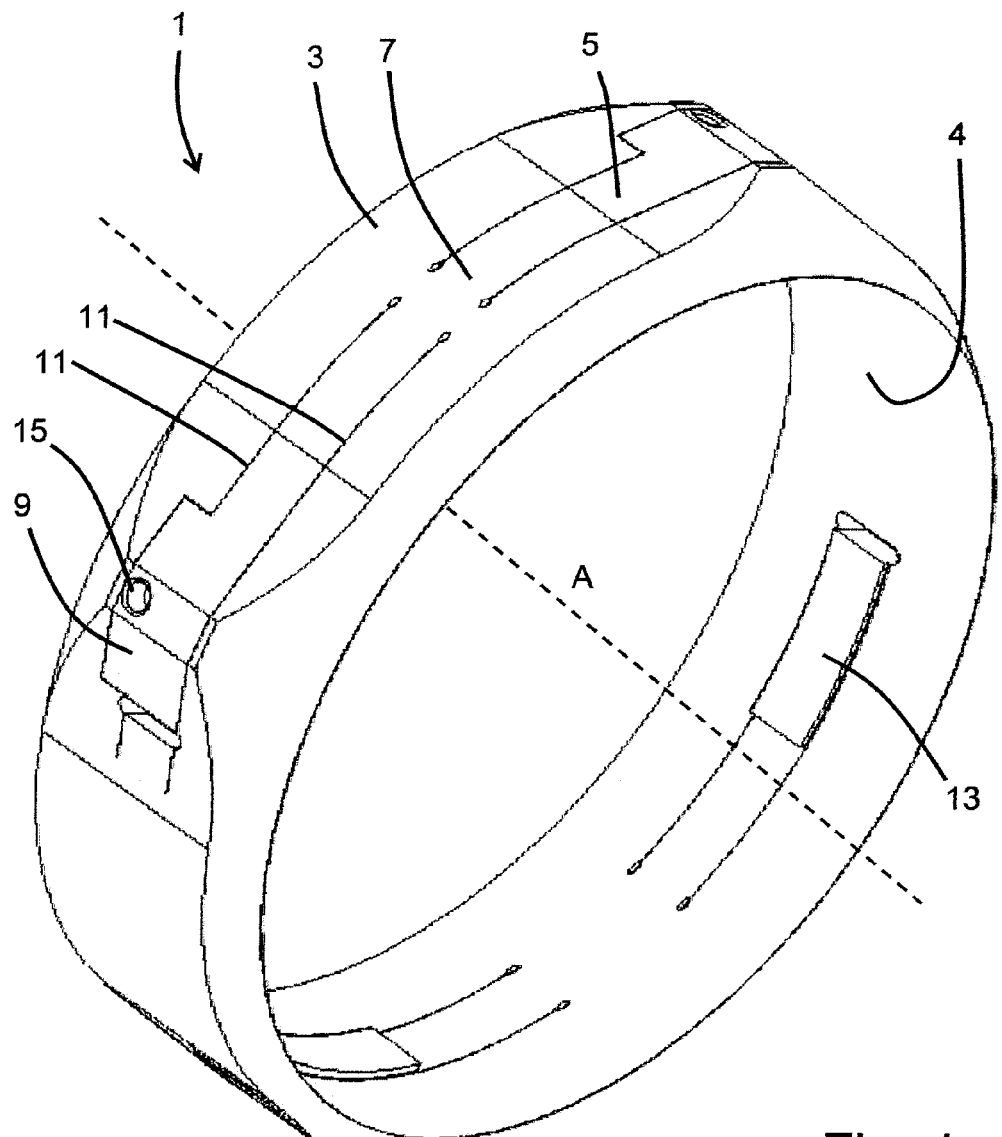

FIG. 1 shows a clamp 1 according to the invention. The shown clamp 1 has a ring-shaped main body 3, to which four locking arms 5 are connected. The locking arms 5 substantially follow the same curvature as the ring shape of the main body 3. Furthermore, the locking arms 5 are fastened to the main body at their base end 7. Their opposite free end 9 can be moved in a radial direction by bending of the locking arm 5. Thus, the locking arms 5 exhibit some flexibility along the radial plane. Advantageously, the locking arms 5 have such an extension in the axial direction A that they exhibit stiffness in the axial direction. In addition, due to the narrowness of slits 11 on each axially facing side of the locking arms 5, between the locking arms 5 and the main body 3, any movement of the locking arms 5 in the axial direction A would be halted by abutment of the locking arms 5 against the main body 3.

On the radially inwardly facing side of the locking arm 5, in the region of the free end 9, the locking arms 5 exhibit a locking pad 13. The locking pad 13 extends further radially inward than an inner diameter 4 of the main body 3. It is adapted to engage with a facing recess 113 (see FIG. 3) arranged in the outer face of a ring-shaped member 101 (FIG. 3) to which the clamp 1 connects. This will be described further below.

On the radially outwardly facing side of the locking arm 5, in the region of the free end 9, the locking arm 5 has a manipulation interface 15 in the form of a threaded hole. In order to move the locking pad 13 out of engagement with the recess 113, an operator can advantageously connect to the threaded hole with a simple screw or with a suitable tool (not shown).

Instead of having the locking arms 5 arranged within the main body 3, one could also imagine them to be arranged on an axial end of the main body 3. In such an embodiment, however, only one slit 11 would contribute to maintaining the axial position. One could also imagine having locking arms 5 on both axial sides of the main body 3.

One could even imagine that instead of the slits 11, there could be voids (not shown). In such an embodiment, the locking arm(s) 5 would not abut against the main body 3 if an axially directed force was exerted onto the clamp 1. A torque force would then arise at the base end 7 of the locking arm 5.

In addition, one could also imagine having only one locking arm 3. However, a plurality of locking arms 5, as shown in FIG. 1, contributes to advantageous distribution of both axial forces and torques.

Furthermore, in stead of having the locking arms 5 extending in the tangential direction, substantially along the curvature of the main body 3 (as shown in FIG. 1), one could imagine an embodiment where the locking arms would extend in the axial direction. The locking arms could then be arranged between slits between the locking arms and the main body, or they could extend in an axial direction beyond the structure of the main body.

Figure 2:
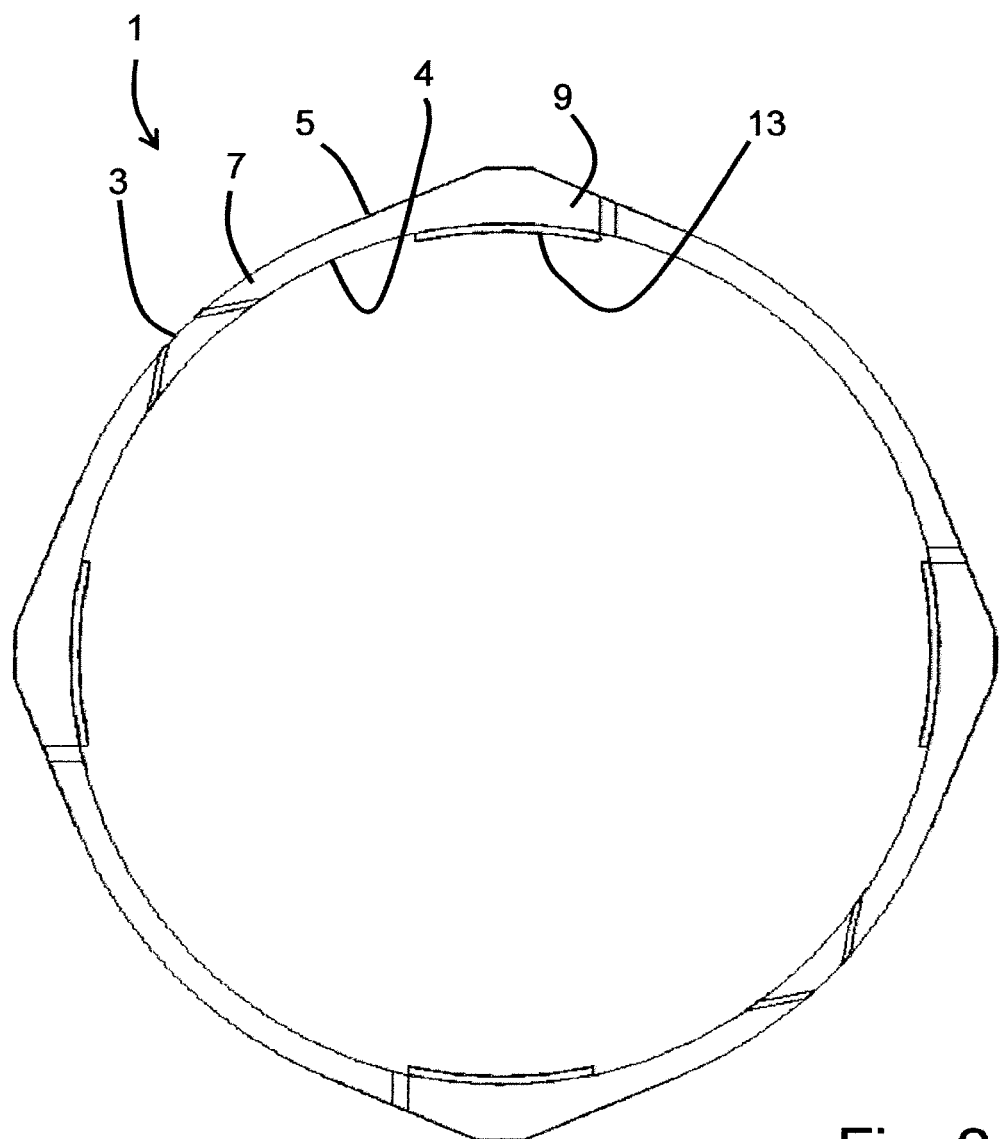
FIG. 2 is a cross section view of the clamp in FIG. 1.
Figure 3:
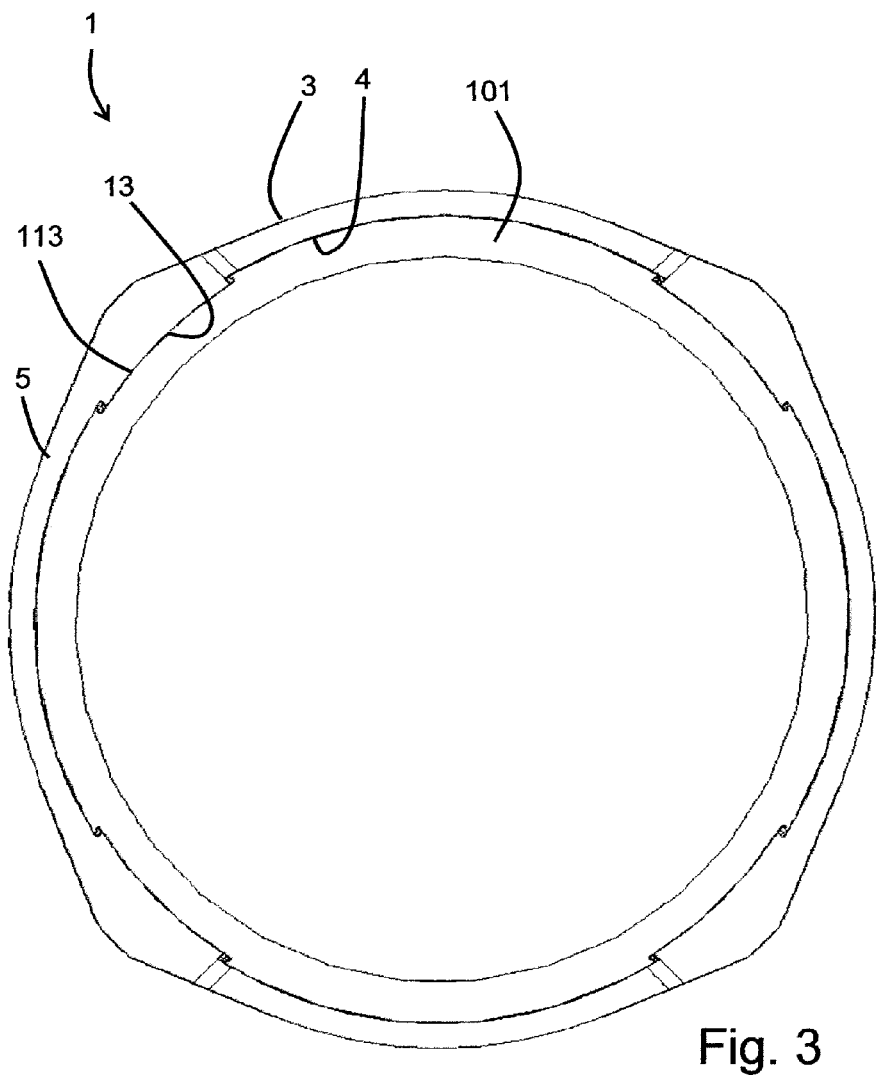
FIG. 3 is a cross section view of the clamp and an inner ring-shaped element.

FIG. 2 shows a cross section view of the clamp 1 in FIG. 1. As shown in FIG. 2, the locking pads 13 are preferably symmetrically distributed along the inner diameter of the main body 3, in order to obtain an even distribution of forces between the clamp 1 and the inner ring shaped element 101 (FIG. 3). Also, of the four locking arms 5 shown in FIG. 1 and FIG. 2, two extend clockwise from their base ends 7, whereas the other two extend anti-clockwise. This feature contributes in withstanding torques in both directions.

An additional advantageous feature is to design the locking arms 5 with different resonance frequencies in order to overcome resonance problems due to vibration.

Figure 4:
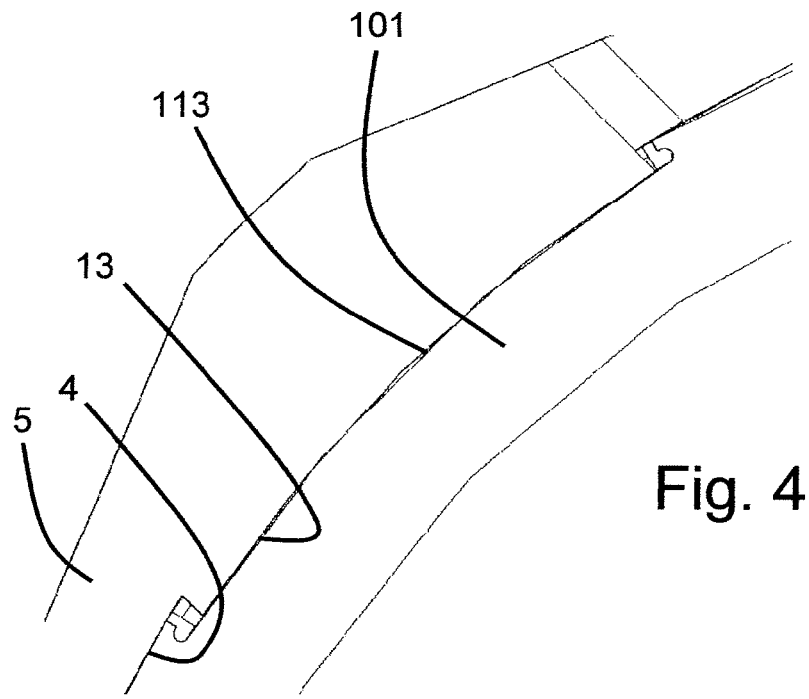
FIG. 4 is an enlarged cross section view of an engagement region.

FIG. 3 shows another cross section view of the clamp 1, however secured on the outside of an inner ring-shaped element 101. As mentioned above, the ring-shaped element 101 exhibits recesses 113 for receiving and for engagement with the locking pads 13 of the locking arms 5. FIG. 4 is an enlarged cross section view of the engagement region of a locking pad 13 and the recess 113.

Figure 5:
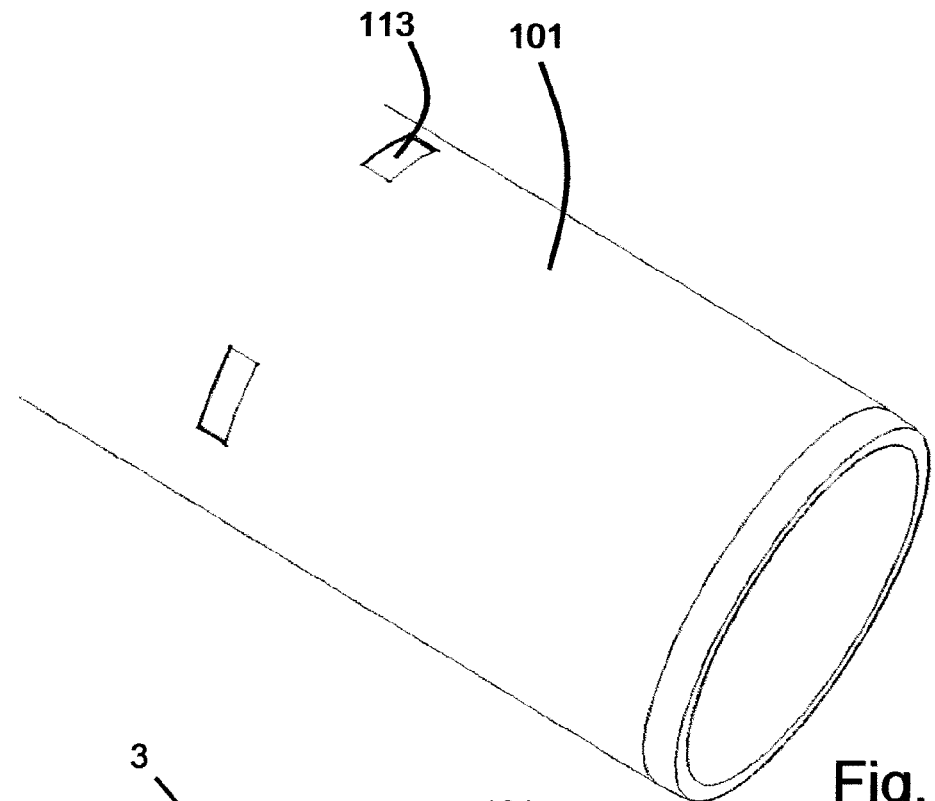
FIG. 5 is a perspective part view of an inner element to which the clamp secures.
Figure 6:
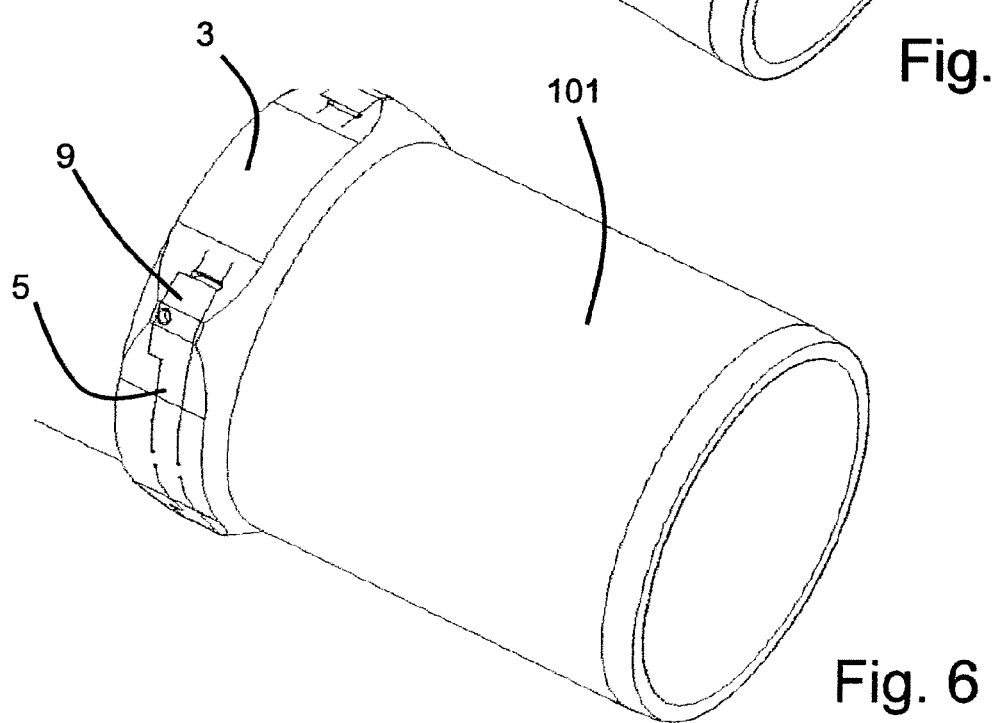
FIG. 6 is the perspective view of FIG. 5, with the clamp attached.

FIG. 5 shows the inner ring shaped element 101 in a perspective view without the clamp 1 attached. In this figure, two of the recesses 113 can be seen. FIG. 6 shows the same inner ring shaped element 101 as FIG. 5, with a clamp 1 connected to it.

Figure 7:
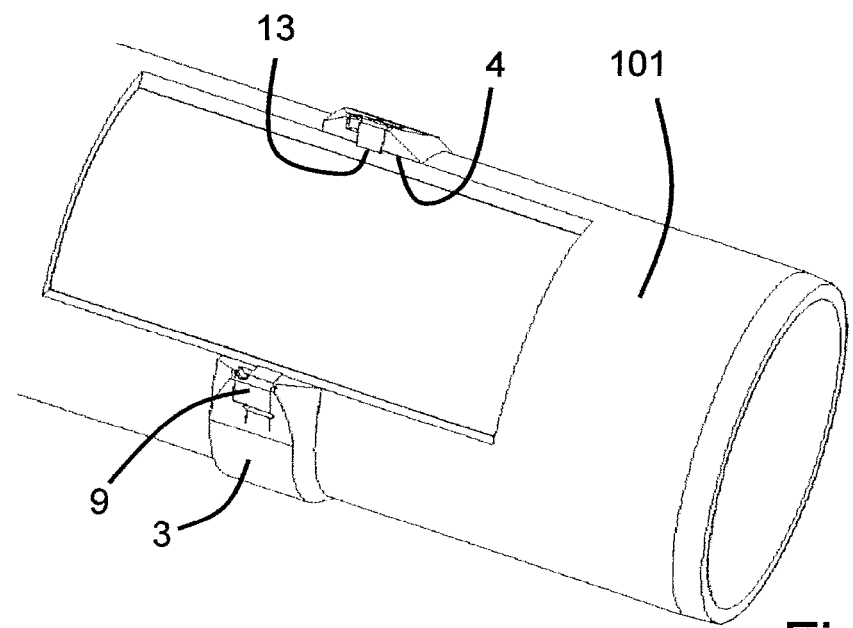
FIG. 7 is a perspective view of an axial cut through the clamp and a pipe to which it is connected.

FIG. 7 shows a cut through a clamp 1 and the inner ring shaped element 101, illustrating how the pads 13 extend into the recess 113 in the inner element 101.

Figure 8:
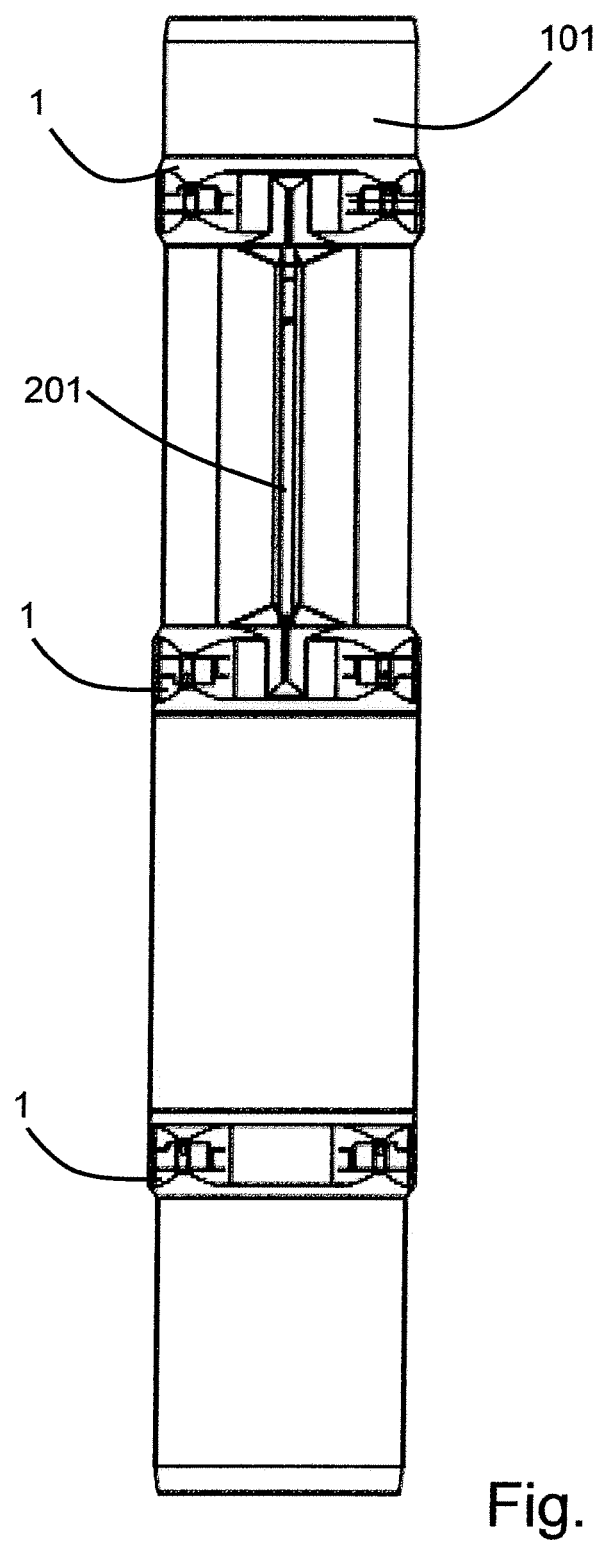
FIG. 8 is a view of an advantageous application of the clamp.

FIG. 8 illustrates a practical use of the clamp 1 according to the invention. In this embodiment, the inner ring shaped element 101 is a piece of pipe adapted to constitute a part of a string of production tubing (not shown). Thus it can advantageously have threads in each end which mates with the threads of the elements of the production tubing.

In this example, a pressure and temperature gauge 201 is arranged between two clamps 1 by welding to at least one of the clamps 1. A transformer coil is also welded to the same clamp. A third clamp is used to protect it and keep the transformer coil in position.

Figure 9:
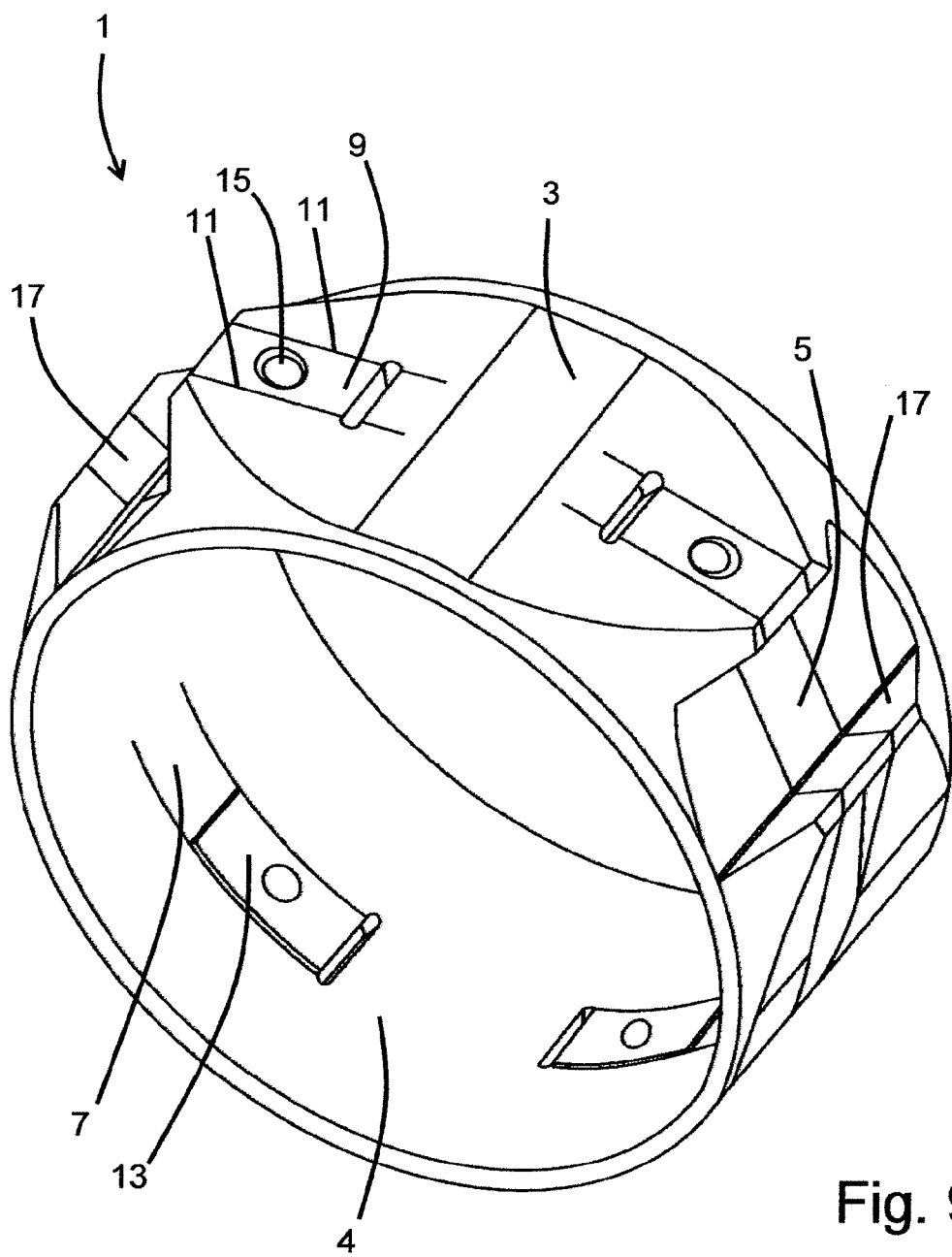
FIG. 9 is a perspective view of another embodiment of a clamp according to the invention.

FIG. 9 shows an alternative embodiment of a clamp 1 according to the present invention. This clamp 1 includes grooves 17 for passing electrical and hydraulic control lines (not shown) for various downhole equipment. The purpose of the clamp 1 is to guide and protect the cables during installation and operation.

Figure 10:
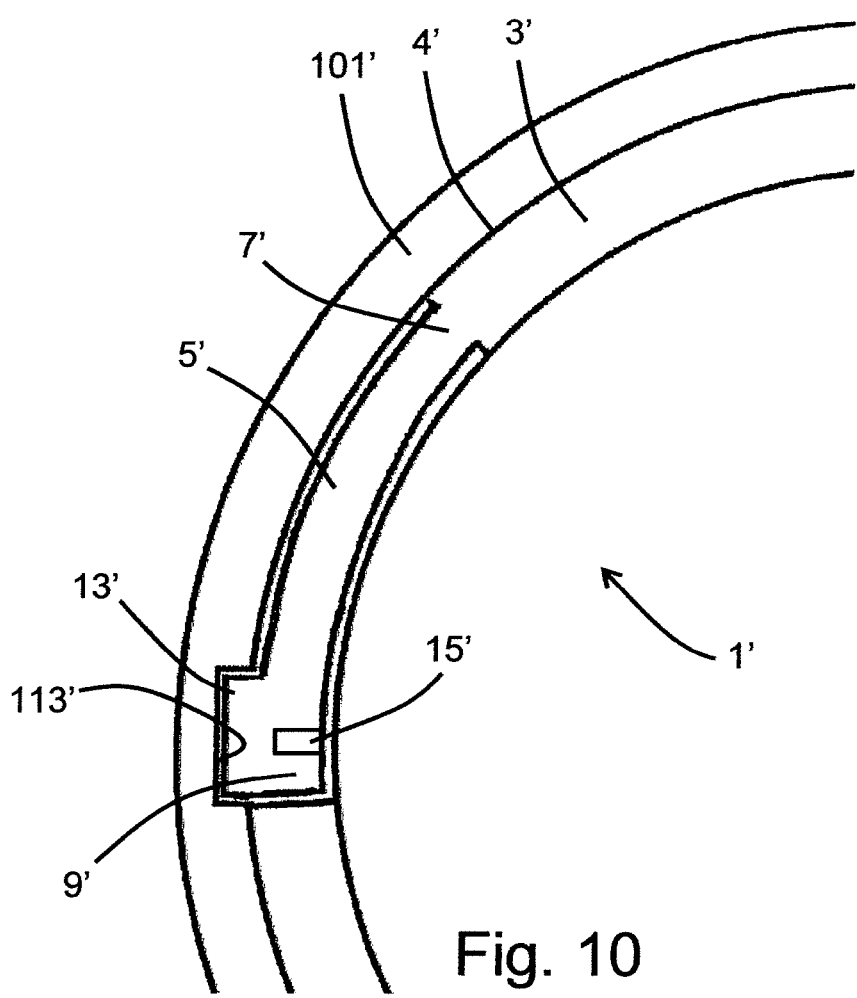
FIG. 10 is an enlarged cross section view of yet an alternative embodiment of the clamp according to the invention.

FIG. 10 illustrates yet an alternative embodiment of the clamp 1' according to the present invention. This clamp 1' is adapted to lock inside an outer circular element 101', such as a bore. As the embodiments described above, the clamp 1' has a main body 3', a locking arm 5' with a locking pad 13' which is adapted to protrude into a recess 113' in the outer element 101'. In order to bend the locking arm 5' radially inwards to release the locking pad 13' from engagement with the recess 113', a manipulation interface 15' is arranged in the locking arm 5'. In this embodiment of the clamp 1' according to the invention, the locking pads 13' protrudes radially beyond an outer diameter 4' of the main body 3, when in the non-bent or non-moved position.

The groove 17 shown in FIG. 9 could also be provided for an embodiment as shown in FIG. 10. The groove would then exist between two protrusions which would extend radially inwards.

The invention claimed is:

1. A clamp comprising:
a continuous-ring-shaped main body adapted to encircle an inner element or to be encircled by an outer element to which the clamp can releasably connect, the continuous-ring-shaped main body having a fixed circumference;
wherein an axially extending opening extends through the continuous-ring-shaped main body;
a locking arm connected to said continuous-ring-shaped main body at a base end and which can bend elastically to move an oppositely positioned free end thereof in a substantially radial direction;
wherein the locking arm comprises a locking pad at a distance from the base end, which in a locking position of the locking arm extends radially beyond an inner or outer diameter, respectively, of the continuous-ring-shaped main body; and
wherein said locking pad is shaped to engage with a recess in said inner or outer element such that the locking pad and the recess mate.

2. The clamp according to claim 1, wherein a longitudinal direction of the locking arm substantially extends along a curvature of the continuous-ring-shaped main body, along and parallel with, a part of a circumference of the continuous-ring-shaped main body.

3. The clamp according to claim 2, wherein the clamp comprises at least two locking arms, wherein at least one locking arm extends in a clockwise direction from its base end and at least one extends in an anti-clockwise direction.

4. The clamp according to claim 1, wherein the clamp comprises a plurality of locking pads which are distributed at substantially equal mutual distances along said inner or outer diameter.

5. The clamp according to claim 1, wherein the locking arm comprises a manipulation interface.

6. The clamp according to claim 5, wherein the manipulation interface is a threaded hole for engagement when bending the locking arm in the substantially radial direction.

7. The clamp according to claim 1, wherein the continuous-ring-shaped main body, the locking arm, and the locking pad are in one piece.

8. The clamp according to claim 1, wherein the locking arm is arranged between two slits, one arranged on each longitudinal side of the locking arm, which slits are arranged between the locking arm and the continuous-ring-shaped main body, and wherein the slits extend circumferentially around a portion of the continuous-ring-shaped main body.

9. The clamp according to claim 1, wherein the clamp comprises an axially extending guiding groove arranged on the opposite radial side of the continuous-ring-shaped main body with respect to the locking pad.

10. The clamp according to claim 1, wherein the clamp is attached to a production tubing extending into a hydrocarbon well.

11. The clamp according to claim 1, wherein the inner element comprises a pipe.

12. The clamp according to claim 1, wherein the outer element comprises a bore.

13. The clamp according to claim 1, wherein, when the locking arm moves between the locking position and an unlocked position, the continuous-ring-shaped main body maintains a constant circumference.

14. A system comprising:
   a clamp comprising:
      a continuous-ring-shaped main body having an axially extending opening therethrough, the continuous-ring-shaped main body having a fixed circumference; and
      a locking arm connected to the continuous-ring-shaped main body at a base end, the locking arm being bendable elastically to move an oppositely positioned free end thereof in a substantially radial direction, the locking arm comprising a locking pad at a distance from the base end and, when in a locking position, extending radially beyond an inner diameter or outer diameter of the continuous-ring-shaped main body; and
   an element having a recess formed therein with which the locking pad engages, the clamp being releasably connectable to the element, the element selected from:
      an outer element encircling the continuous-ring-shaped main body; and
      an inner element encircled by the continuous-ring-shaped main body.

15. The system according to claim 14, wherein, when the locking arm moves between the locking position and an unlocked position, the continuous-ring-shaped main body maintains a constant circumference.

* * * * *